United States Patent
Biba et al.

(10) Patent No.: US 11,827,195 B2
(45) Date of Patent: Nov. 28, 2023

(54) PEDAL OPERATING UNIT

(71) Applicant: Continental Teves AG & Co. OHG, Frankfurt am Main (DE)

(72) Inventors: Sebastian Biba, Babenhausen (DE); Manfred Rüffer, Sulzbach (DE); Andreas Bischoff, Frankfurt am Main (DE); Horst Krämer, Ginsheim-Gustavsburg (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 31 days.

(21) Appl. No.: 17/596,399

(22) PCT Filed: Jun. 17, 2020

(86) PCT No.: PCT/EP2020/066706
§ 371 (c)(1),
(2) Date: Dec. 9, 2021

(87) PCT Pub. No.: WO2020/254368
PCT Pub. Date: Dec. 24, 2020

(65) Prior Publication Data
US 2022/0306055 A1 Sep. 29, 2022

(30) Foreign Application Priority Data

Jun. 19, 2019 (DE) .................... 10 2019 208 969.0
Oct. 9, 2019 (DE) .................... 10 2019 215 429.8

(51) Int. Cl.
*B60T 7/06* (2006.01)
*B60T 7/04* (2006.01)
*G05G 5/03* (2008.04)

(52) U.S. Cl.
CPC ............... *B60T 7/06* (2013.01); *B60T 7/042* (2013.01); *G05G 5/03* (2013.01); *B60T 2220/04* (2013.01)

(58) Field of Classification Search
None
See application file for complete search history.

(56) References Cited

U.S. PATENT DOCUMENTS 3,972,190 A * 8/1976 Sawyer ...................... B60T 7/06
60/551
5,868,040 A 2/1999 Papenhagen et al.
(Continued)

FOREIGN PATENT DOCUMENTS

CN 1847065 A 10/2006
DE 19741366 C1 4/1999
(Continued)

OTHER PUBLICATIONS

German Search Report dated Sep. 10, 2020 for the counterpart German Patent Application No. 10 2019 215 429.8.
(Continued)

*Primary Examiner* — Vicky A Johnson

(57) ABSTRACT

A pedal operating unit having a brake pedal, which is mounted to be pivotable about a first pivot, and a restoring mechanism, wherein the restoring mechanism is designed to apply a restoring force to the brake pedal in the direction of its rest position when the brake pedal is deflected out of the rest position thereof. The restoring mechanism has at least one first restoring device and one second restoring device. An increase in the restoring force is effected, in particular exclusively, by the first restoring device over a first angular range of a pivoting movement of the brake pedal about the first pivot, and an increase in the restoring force is effected, in particular exclusively, by the second restoring device over
(Continued)

a second angular range of a pivoting movement of the brake pedal about the first pivot.

16 Claims, 5 Drawing Sheets

(56) References Cited

U.S. PATENT DOCUMENTS

| | | | | |
|---|---|---|---|---|
| 6,253,635 | B1* | 7/2001 | Huber | G05G 1/46 |
| | | | | 267/44 |
| 2006/0230870 | A1 | 10/2006 | Fukase | |
| 2012/0216651 | A1* | 8/2012 | Soltys | B60T 7/06 |
| | | | | 74/512 |
| 2013/0233118 | A1* | 9/2013 | Khan | B60T 7/042 |
| | | | | 74/514 |
| 2016/0273630 | A1 | 9/2016 | Ogawa | |
| 2019/0278318 | A1 | 9/2019 | Lee | |

FOREIGN PATENT DOCUMENTS

| | | |
|---|---|---|
| DE | 102008051316 A1 | 2/2010 |
| DE | 102011016241 A1 | 10/2012 |
| DE | 102012217541 A1 | 3/2014 |
| DE | 102016104836 A1 | 9/2016 |
| DE | 102019105271 A1 | 9/2019 |
| DE | 102019101646 A1 | 7/2020 |
| EP | 13527722 A2 | 10/2003 |
| ER | 2730832 A1 | 8/1996 |

OTHER PUBLICATIONS

The International Search Report and the Written Opinion of the International Searching Authority dated Jul. 21, 2020 for the counterpart PCT Application No. PCT/EP2020/066706.

Chinese First Office Action dated Oct. 10, 2022 for the counterpart Chinese Patent Application No. 202080044353.5.

* cited by examiner

PEDAL OPERATING UNIT

CROSS-REFERENCE TO RELATED APPLICATION(S)

The present application is a National Stage Application under 35 U.S.C. 371 of International Application No. PCT/EP2020/066706, filed on Jun. 17, 2020, which claims priority from German Patent Application No. 2019208969 filed on Jun. 19, 2019, in the German Patent and Trade Mark Office and German Patent Application No. 2019215429 filed on Oct. 9, 2019, in the German Patent and Trade Mark Office, the disclosures of which are herein incorporated by reference in their entireties.

BACKGROUND

1. Field

Embodiments of the present application relate to a pedal operating unit.

2. Description of Related Art

Pedal operating units known in the prior art are often connected hydraulically to a brake pedal simulator, wherein the brake pedal simulator simulates the pedal feel expected by a vehicle driver when a brake pedal is operated. In normal operation of a brake system having a pedal operating unit of this kind, there is no direct hydraulic connection between the brake pedal and the wheel brakes per se. On the contrary, the brake pressure in the wheel brakes derived from the operation of the pedal operating unit is produced by a pressure supply device, often electromechanical, in combination with a corresponding hydraulic valve circuit.

On a hydraulic fallback level, a direct hydraulic connection between the pedal unit and the wheel brakes can be established by appropriate control of the hydraulic brake system or of a corresponding valve circuit, thus enabling failure of the pressure supply device to be at least partially compensated.

For modern vehicle architectures, however, a pure "drive-by-wire" solution, in which there is no longer any hydraulic connection between the pedal operating unit and the hydraulic brake system, is becoming increasingly relevant. At the same time, however, such a pedal operating unit should continue to give a vehicle driver the feel of a hydraulic brake system.

SUMMARY

It is then the underlying object of the present application to provide a pedal operating unit which, without a hydraulic connection to the brake system, gives a vehicle driver the accustomed feel associated with brake operation when the pedal is operated.

This object is achieved by the pedal operating unit as claimed in claim 1. The dependent claims relate to advantageous embodiments.

In a first aspect, an embodiment relates to a pedal operating unit having a brake pedal, which is mounted in such a way as to be pivotable about a first pivot, and a restoring mechanism, wherein the restoring mechanism is designed to apply a restoring force to the brake pedal in the direction of the rest position thereof when the brake pedal is deflected out of its rest position, wherein the restoring mechanism has at least one first restoring device and one second restoring device. According to the embodiment, provision is made here for an increase in the restoring force to be effected, in particular exclusively, by the first restoring device over a first angular range of a pivoting movement of the brake pedal about the first pivot, and for an increase in the restoring force to be effected, in particular exclusively, by the second restoring device over a second angular range of a pivoting movement of the brake pedal about the first pivot.

In this case, the restoring force on the brake pedal in the direction of its rest position preferably increases continuously with the degree of deflection.

The pedal operating unit according to the embodiment has the advantage that the elimination of hydraulic connections to the actual brake system enables it to be positioned freely in the footwell of a vehicle. It is possible to eliminate a connection between the footwell of the vehicle and the engine bay, in which the pressure supply device of a brake system is usually arranged, since the signals required to control the brake system can be transmitted in other ways.

In a preferred embodiment, the first restoring device comprises a torsion spring. Here, the torsion spring is preferably designed in such a way that the torsion spring has a first spring leg and a second spring leg, wherein, when the angle between the first spring leg and the second spring leg changes from a rest position of the spring legs relative to one another, the torsion spring applies a restoring force to the spring legs in the direction of the rest position of the spring legs.

According to another preferred embodiment, the second restoring device comprises a spiral spring and at least one elastic element, in particular an elastomer.

Such a pedal operating unit with purely mechanical restoring devices has the advantage that, by virtue of the elimination of hydraulic components, it is completely maintenance-free and free from wear, especially since no sealing elements are required.

According to a preferred embodiment, the increase in the restoring force brought about by the second restoring device is effected only by the spiral spring over a first force range, and is effected by the spiral spring and the elastic element over a second force range. In this case, the first force range preferably extends over smaller force values than the second force range.

In this way, it is possible, through the interaction of the two restoring devices, to achieve a restoring force with a force-deflection characteristic which simulates the behavior of a hydraulic brake system with wheel brakes actuated directly by the brake pedal. By means of a relatively weak torsion spring, it is possible to produce a characteristic which initially rises only slightly with the operating travel and which, in the case of a conventional hydraulic brake, corresponds to the operating range in which the release clearance of the wheel brakes, i.e. the initial clearance between the friction pads and the brake disk, is first of all traversed. After the release clearance has been traversed, the restoring force rises exponentially if the brake is actuated further, this being due to the compression of the brake pads and further deformations of the wheel brakes, e.g. of the brake calipers. This range can be simulated efficiently by a combination of a spiral spring and an elastic element.

According to a preferred embodiment, the elastic element is arranged within the spiral spring, allowing a more compact overall construction.

In particular, according to another preferred embodiment, the second restoring device is in the form of a spring strut, which, according to another embodiment, has two spring plates, between which the spiral spring is arranged.

To arrange the elastic element in a spring strut of this kind, another embodiment envisages that the elastic element is of annular or tubular design. By virtue of such a design of the elastic element, the elastic element can preferably be arranged within the spiral spring and between the spring plates of the spring strut, thus enabling a compact overall construction to be achieved.

In this case, the increase in the restoring force brought about by the second restoring device is preferably effected only by the spiral spring over a first force range, and is effected by the spiral spring and the elastic element over a second force range. In this case, the first force range preferably extends over smaller force values than the second force range.

According to another embodiment, it is envisaged that the brake pedal is articulated on a lever which is mounted in such a way as to be pivotable about a second pivot and which, when the brake pedal pivots out of its rest position, is likewise pivoted out of its rest position about the second pivot. According to another embodiment, it is envisaged that the restoring mechanism is designed to apply the restoring force to the lever when the brake pedal is deflected out of the rest position thereof. Such an embodiment of the articulation of the pedal has the advantage that the pivoting axis of the pedal can be chosen independently of the restoring mechanism, ensuring greater freedom in the articulation of the pedal and, accordingly, better adaptability to the assembly situation in the vehicle.

In this case, the first pivot and the second pivot are preferably aligned parallel to one another, simplifying the coupling of the movement of the lever to the movement of the brake pedal.

For the articulation of the torsion spring as the first restoring device when the brake pedal is operated, it is envisaged according to another embodiment that the lever has a driver element, which is designed to engage in the first spring leg of the torsion spring. The driver element can be, for example, a pin which is aligned parallel to the pivot of the lever and projects from the lever. The pin is preferably connected by material bonding to the lever or formed in one piece with the latter.

As an abutment for the torsion spring, it is envisaged according to another embodiment that the second spring leg of the torsion spring is supported on a pivotably mounted spring disk. According to a preferred embodiment, the spring disk is mounted in such a way as to be pivotable about the second pivot. According to another embodiment, the torsion spring is furthermore also mounted on the second pivot.

To ensure that the spring disk can act as an abutment for the torsion spring, it is envisaged according to another embodiment that the second restoring device is articulated on the spring disk by means of a first end. According to a preferred embodiment, the articulation point of the second restoring device on the spring disk is spaced apart from the second pivot. Consequently, when the spring disk is subjected to a first torque by the torsion spring, the second restoring device applies a second torque, opposed to the first torque, on the spring disk, preventing rotation of the spring disk about the second pivot. Thus, when the brake pedal is operated, a restoring force is initially provided only by the torsion spring.

According to another embodiment, it is furthermore envisaged that the spring disk has a radial projection, wherein the driver element of the lever comes into engagement with the radial projection after the lever has pivoted by a defined pivoting angle. From the time when the driver element strikes the radial projection, any further movement of the brake pedal is subject to a corresponding restoring force only from the second restoring device in the form of the spring strut, resulting in a noticeable increase in the restoring force from this time. By means of the position of the radial projection, it is accordingly possible to specify over what ranges of the pivoting movement of the brake pedal which restoring device applies a counterforce to the brake pedal, thus enabling the force-deflection characteristic of the structure to be selectively adjusted. Owing to the direct transition from the first restoring device to the second restoring device, the force-deflection characteristic does not have any discontinuities here.

According to another embodiment, it is furthermore envisaged that the pedal operating unit has a housing, wherein the second restoring device is secured by means of a second end on the housing. Consequently, the housing serves as an abutment for the second restoring device, and therefore the second restoring device is compressed between the spring disk and the housing when the brake pedal is operated.

According to another embodiment, the housing is furthermore used to fix the pivots in that the first pivot and/or the second pivot are/is mounted in the housing.

According to another embodiment, it is furthermore envisaged that, on the housing, there is arranged a stop element, which limits a movement of the lever in the direction of the restoring force produced by the restoring mechanism. The stop element thus defines the zero position of the brake pedal. Here, the stop element can be of pin-shaped design and is preferably connected by material bonding to the housing or is formed integrally with the housing.

In this case, the housing is preferably designed in such a way that it completely encloses the other components of the pedal operating unit, and therefore all the moving parts of the mechanical structure are arranged within the housing. In this way, obstruction of the brake pedal by objects that have got into the mechanism can be avoided.

To detect a braking request by means of the pedal operating unit, it is furthermore envisaged according to another embodiment that the pedal operating unit has at least one sensor device, which is designed to detect the degree of deflection of the brake pedal out of the rest position thereof. According to another embodiment, it is envisaged for this purpose that the sensor device is designed to determine a rotation angle of the lever relative to the rest position thereof about the second pivot. From the rotation angle, it is possible, in turn, to directly infer a braking requirement of the driver.

To detect the rotation angle of the lever about the second pivot, it is envisaged according to another embodiment that the sensor device is arranged on the second pivot.

According to another embodiment, it is furthermore envisaged that the pedal operating unit has at least one force sensor, wherein the force sensor is designed to detect a force acting on the brake pedal. It is particularly preferred here if the force sensor is arranged directly in the brake pedal, e.g. directly within the step plate or under a rubber covering arranged on the step plate, thus enabling the force acting on the brake pedal to be determined directly, i.e. without any prior deflection of the effective force by any lever and pivoting mechanisms that are present in the pedal operating unit.

The use of such a force sensor, particularly when the force sensor is arranged directly in the brake pedal, has the advantage that it is still possible to detect actuation of the pedal operating unit when a mechanical malfunction of the pedal mechanism is preventing pivoting of the brake pedal out of a rest position.

The use of such a force sensor is particularly advantageous in combination with a sensor for detecting linear displacement of the brake pedal (travel sensor) and with a sensor for detecting a pivoting angle of a lever arm of the pedal mechanism (angle sensor). From a joint consideration of the detected values for an operating travel, an operating angle and an operating force, it is possible to check the plausibility of the pieces of information acquired in the context of operation of the pedal operating unit against one another, thus making it possible to detect a malfunction of one of the sensors or a fault in the pedal mechanism. It is thus possible, for example, for a malfunction of one of the restoring devices or both restoring devices to lead to the travel sensor and the angle sensor continuously indicating maximum actuation of the pedal operating unit, even though the driver of the vehicle is not actuating the pedal, owing to the absence of the restoring force and hence the fact that the brake pedal is no longer returning to its rest position. By simultaneous determination of the operating force acting on the brake pedal, however, it would be possible to detect such a fault reliably since no operating force would be detected in the case of a maximum deflection of the brake pedal, which would clearly indicate a malfunction in the pedal mechanism.

By combining the information, it is furthermore also possible to detect wear on the elements of the pedal operating unit if the correlation of the signals for the operating force, the operating travel and the operating angle deviates from an expected value. Jamming of elements of the pedal mechanism could also be detected, for example, from a time offset between signals acquired during pedal operation. For example, a time delay of an operating travel determined relative to the operating force determined would indicate jamming and hence an increased breakaway torque of the pedal mechanism.

In summary, a pedal operating unit according to one of the embodiments described above may have the following advantages:
- the pedal operating unit can be positioned freely in the footwell of a vehicle,
- the connection between the footwell and the engine bay behind the brake pedal can be eliminated since the signals required for the control of the brake system can be transmitted in other ways,
- the pedal operating unit is maintenance-free since it does not contain any fluids,
- the pedal operating unit is wear-free since there are no sealing elements,
- no precision components are required, and therefore the pedal operating unit can be produced at low cost,
- an enclosed construction is possible, and therefore no obstruction of the pedal can occur,
- in respect of sensor selection and positioning of the sensors, the pedal operating unit can be adapted in a flexible way,
- the pedal characteristic can be adapted in a simple manner by altering the restoring devices,
- the integrated rubber spring allows compact construction,
- owing to the in-series connection of the spring elements, the pedal characteristic generated does not have any discontinuities,
- application-specific modular construction is possible.

BRIEF DESCRIPTION OF THE DRAWINGS

Preferred embodiments are explained in more detail below on the basis of the drawings. In the drawings.

DETAILED DESCRIPTION

In the following text, features that are similar or identical are denoted by the same reference signs.

Figure 1:
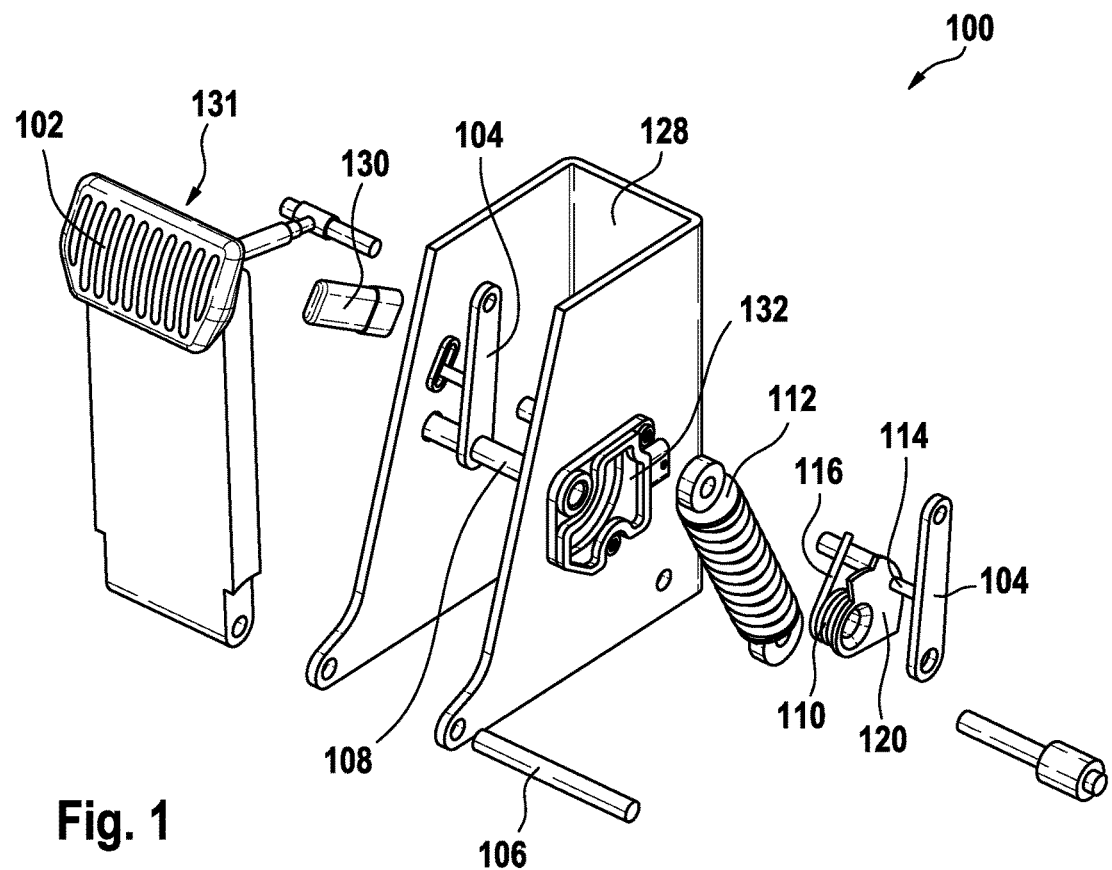
FIG. 1 shows an exploded view of a pedal operating unit.

FIG. 1 shows an exploded view of a pedal operating unit 100 having a brake pedal 102, which is mounted in such a way as to be pivotable about a first pivot 106. In the example illustrated, the brake pedal 102 is a step plate, which is covered with rubber. The brake pedal 102 is operated by the driver. A rotation of the lever 104 about a second pivot 108 is thereby initiated. In this case, a force sensor 131 is arranged on the brake pedal 102, in particular directly below the rubber of the step plate of the brake pedal 102, said sensor being designed to detect an operating force acting on the brake pedal 102.

Figure 3A:
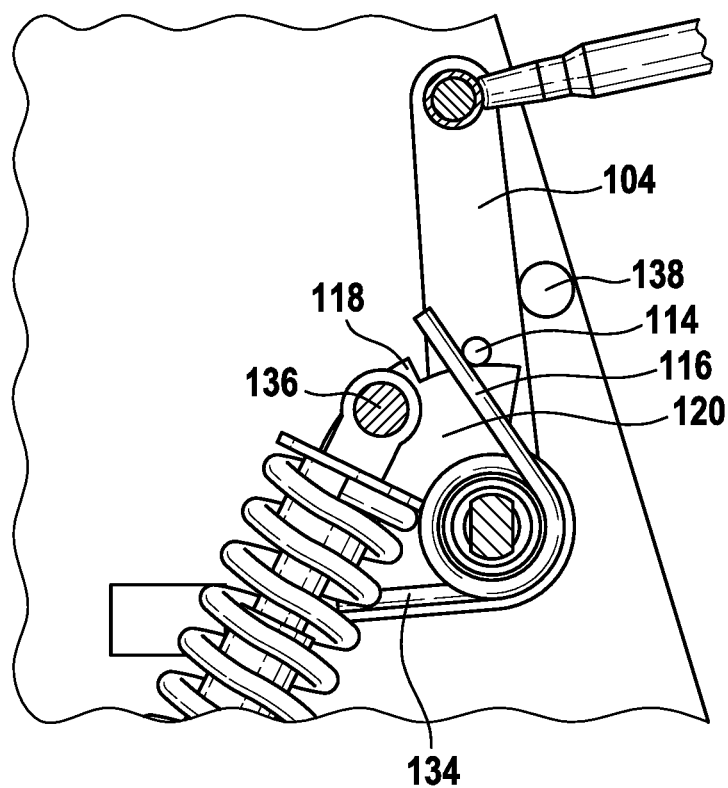
FIG. 3 shows a detail view of the intersection between the first restoring device and the second restoring device.
Figure 3B:
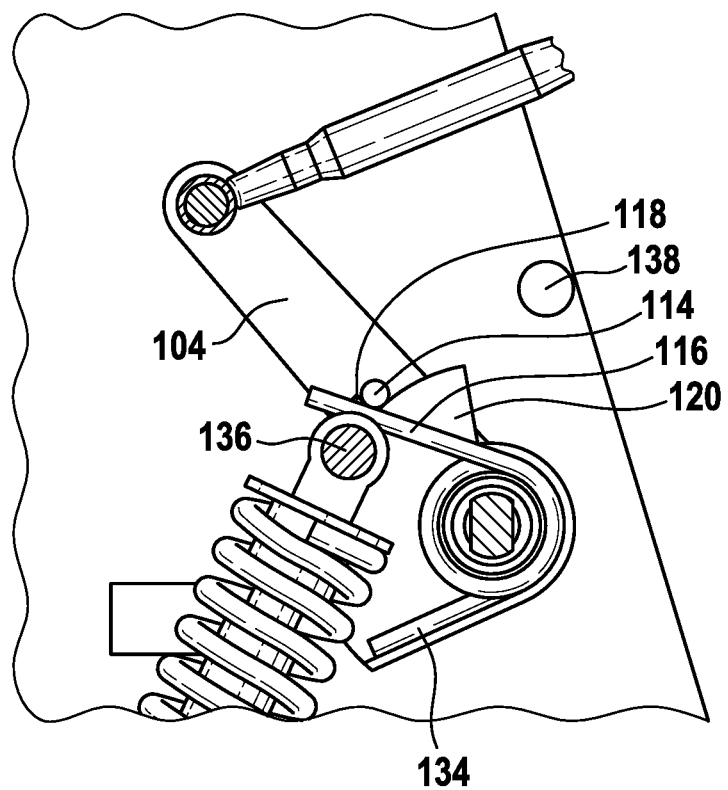

The desired force-displacement characteristic of the pedal operating unit 100 is achieved by series connection of the torsion spring 110 as the first restoring device and the spring strut 112 as the second restoring device. First of all, the driver element 114 of the lever 104 presses on a first spring leg 116 of the torsion spring 110. This can be clearly seen in FIG. 3a), for example. The second spring leg 134 is supported on the spring disk 120, which is mounted in such a way as to be pivotable about the second pivot 108. The spring strut 112 is furthermore articulated at one end on the spring disk 120, wherein the corresponding articulation point 136 is spaced apart from the second pivot 108. Consequently, the spring strut 112 drives the spring disk 120 into its rest position. Here, the rest position is defined by the stop element 138, which is arranged on the housing 128. In this case, the pin-shaped stop element 138 can be connected to the housing 128 by material bonding, for example, or can be formed integrally with the housing 128.

After a certain travel of the brake pedal 102 and a corresponding rotation of the lever 104 about the first pivot 106, the driver element 114 comes into engagement with a projection 118 on the spring disk 120, with the result that the force is transferred directly from the driver element 114 to the spring disk 120. The torsion spring 110 then no longer contributes to an increase in the restoring force produced. From here, only the spring strut 112 is in engagement.

Figure 2:
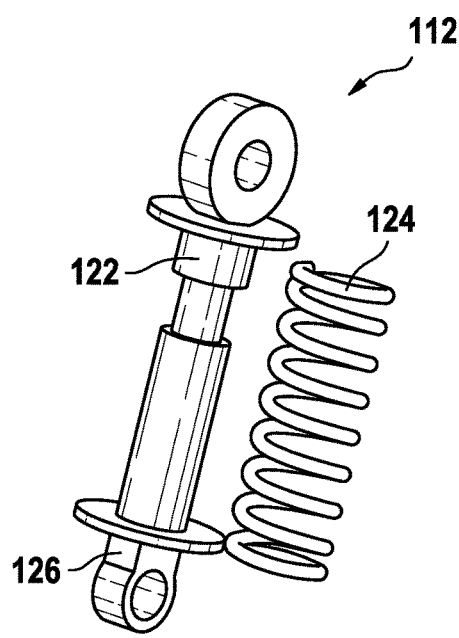
FIG. 2 shows a detail of a second restoring device designed as a spring strut.

The spring strut 112 is illustrated in detail in FIG. 2. In order to give the required characteristic of a progression toward the end of the operating travel of the brake pedal 102, a tubular elastic element 122, preferably an elastomer, is inserted in the spring strut 112 and arranged within the spiral spring 124 of the spring strut 112. The spiral spring, in turn, is clamped axially between two spring plates 140 and 142. With increasing compression of the spring strut, the elastic element 122 is compressed by the cylinder 126 of the spring strut 112 after a certain degree of compression.

To detect a deflection of the brake pedal 102 out of the rest position thereof, which takes place as a result of operation of the brake pedal 102, a travel sensor 130 and an angle sensor 132 are arranged as sensor devices on the housing 128 of the pedal operating unit 100, said sensors detecting a rotation of one of the pivots, preferably the second pivot 108, or being articulated in such a way on the lever 104, by means of a mechanism, that a linear displacement of the lever 104 can be detected. The electric signals thus detected can then be converted into a corresponding operating travel of the brake pedal 102 and hence into a driver braking requirement. The brake system of a vehicle in which the pedal operating unit 100 is arranged can then be controlled in accordance with the detected driver braking requirement.

Figure 4:
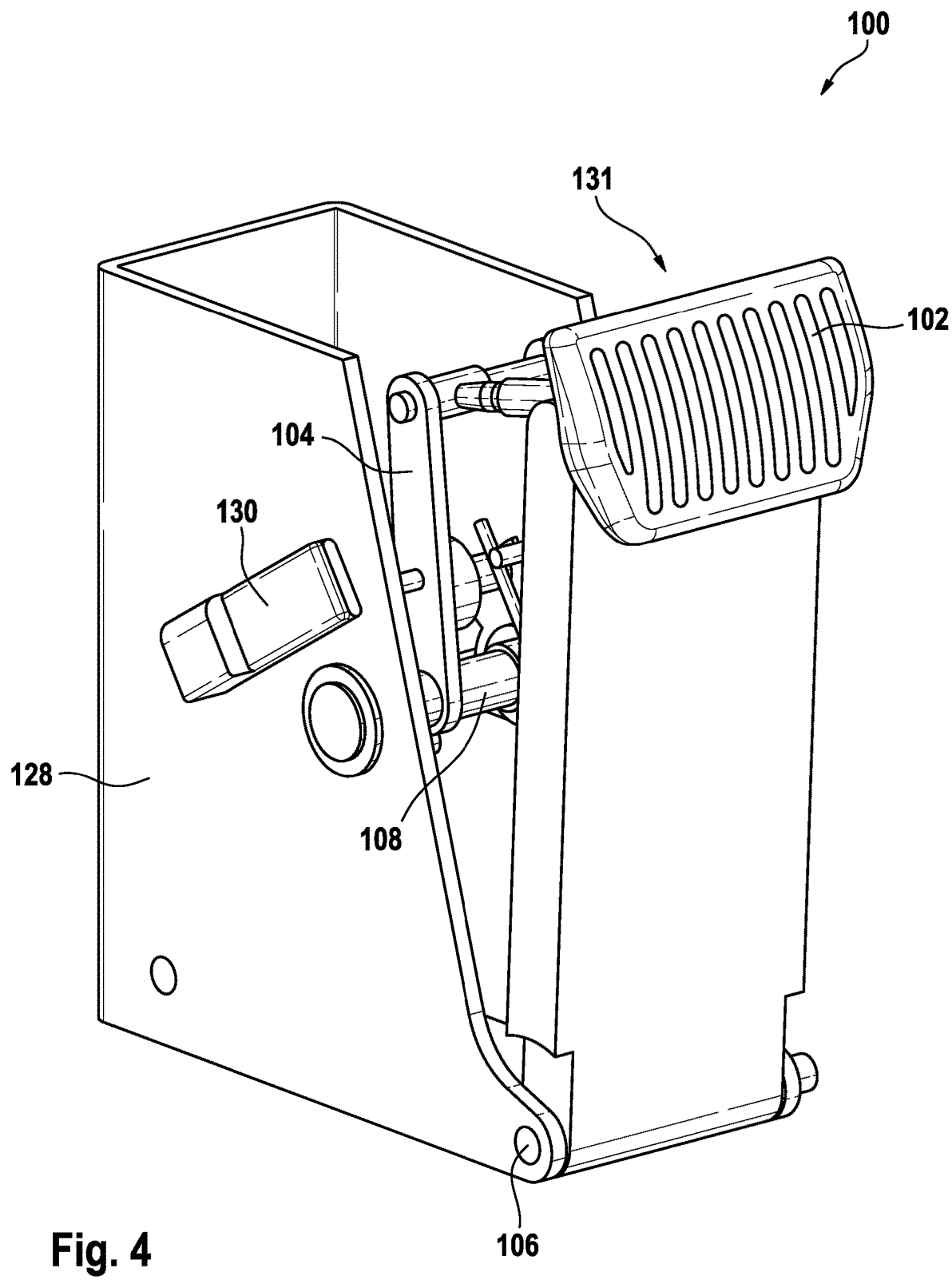
FIG. 4 shows a perspective view of the pedal operating unit.
Figure 5:
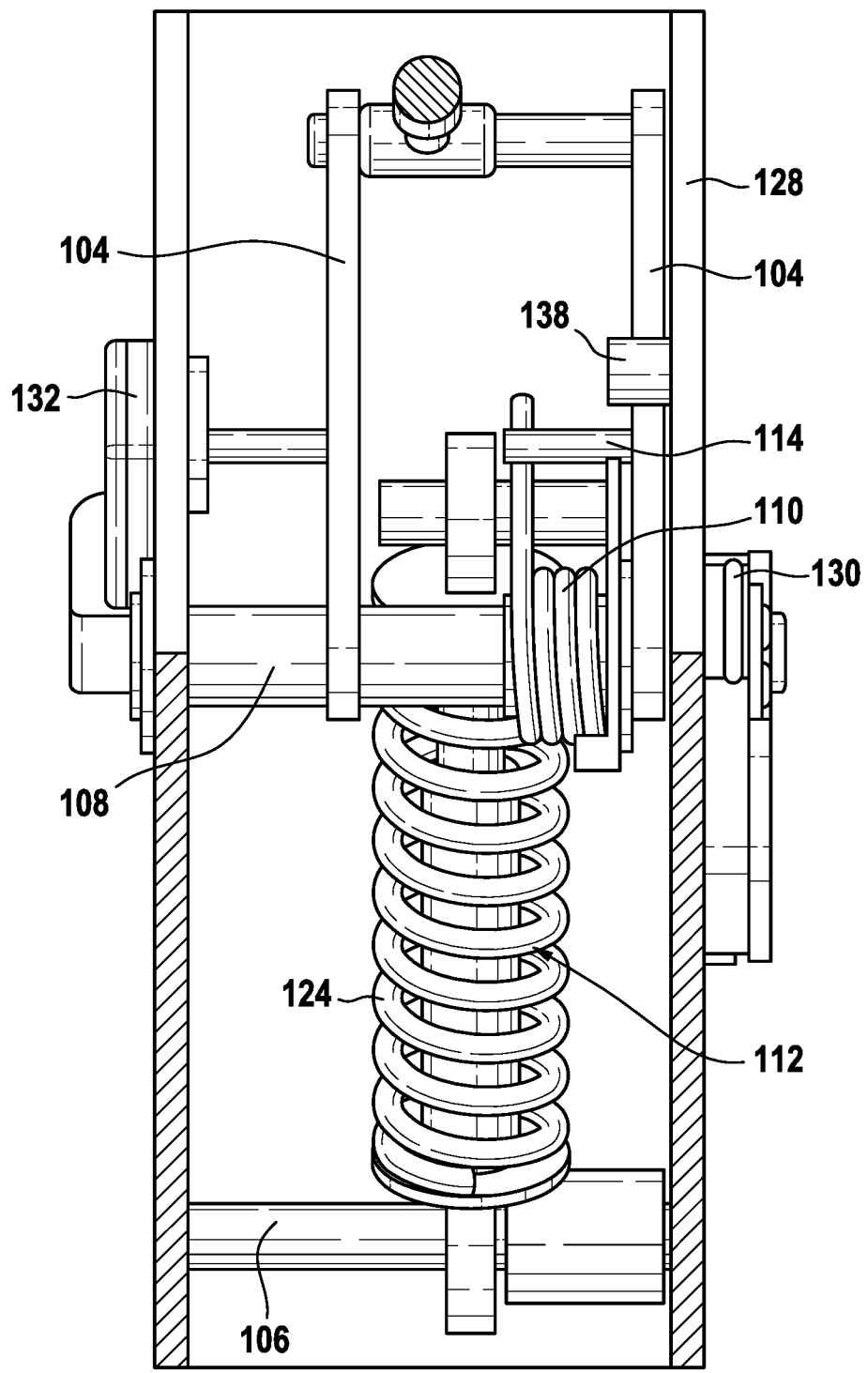
FIG. 5 shows a frontal sectional view of the pedal operating unit.
Figure 6:
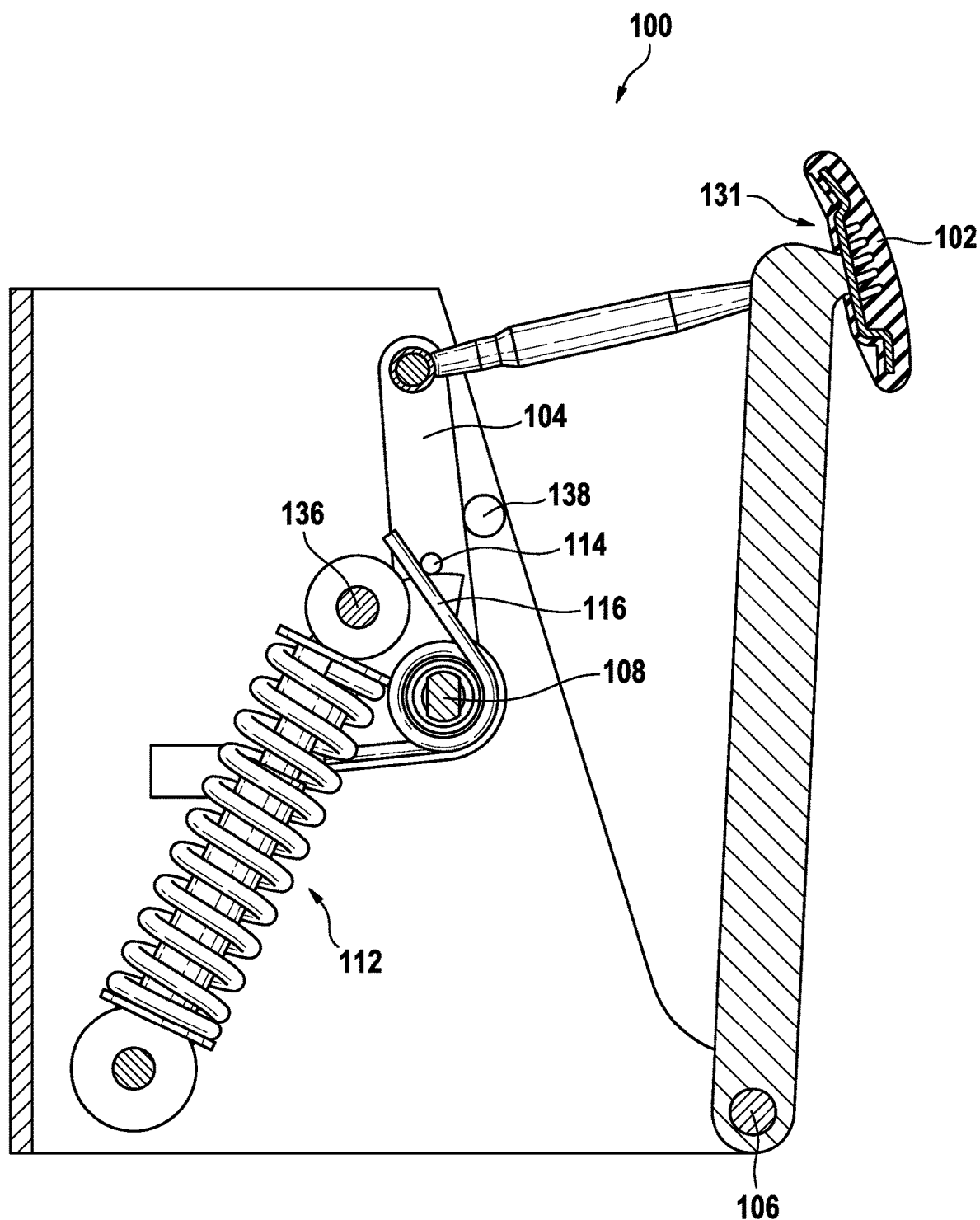
FIG. 6 shows a lateral sectional view of the pedal operating unit.

The above-described pedal operating unit 100 is illustrated once again in various views in the assembled state in FIGS. 4, 5 and 6.

In summary, the concept of the present application is based on the design of a mechanical pedal operating unit without hydraulic fluid. The simulation of the pedal feel is accomplished by connecting springs to give the force-displacement characteristic customary for a brake pedal.

The invention claimed is:

1. A pedal operating unit comprising:
a brake pedal mounted to be pivotable about a first pivot; and
a restoring mechanism configured to apply a restoring force to the brake pedal in a direction of a rest position of the brake pedal when the brake pedal is deflected out of the rest position,
wherein the restoring mechanism comprises a first restoring device and one second restoring device having a first end and a second end,
wherein the first restoring device is configured to increase the restoring force over a first angular range of a pivoting movement of the brake pedal about the first pivot, and the second restoring device is configured to increase the restoring force over a second angular range of a pivoting movement of the brake pedal about the first pivot,
wherein the pedal operating unit comprises a housing, and
wherein the second restoring device is secured by a second end on the housing.

2. The pedal operating unit as claimed in claim 1, wherein the first restoring device comprises a torsion spring.

3. The pedal operating unit as claimed in claim 2, wherein the torsion spring comprises:
a first spring leg; and
a second spring leg,
wherein, when an angle between the first spring leg and the second spring leg changes from a rest position of the first spring leg relative to the second spring leg, the torsion spring applies a restoring force to the first spring leg and the second spring leg in a direction of the rest position of the first spring leg relative to the second spring leg.

4. The pedal operating unit as claimed in claim 2, wherein the brake pedal is articulated on a lever mounted to be pivotable about a second pivot and which, when the brake pedal pivots out of the rest position, is likewise pivoted out of the rest position about the second pivot.

5. The pedal operating unit as claimed in claim 4, wherein the lever comprises a driver element configured to engage in the first spring leg of the torsion spring.

6. The pedal operating unit as claimed in claim 5, wherein the second spring leg of the torsion spring is supported on a pivotably mounted spring disk.

7. The pedal operating unit as claimed in claim 6, wherein the spring disk is mounted to be pivotable about the second pivot.

8. The pedal operating unit as claimed in claim 6, wherein the spring disk comprises a radial projection, and
wherein the driver element of the lever comes into engagement with the radial projection after the lever has pivoted by a defined pivoting angle.

9. The pedal operating unit as claimed in claim 8, wherein the second restoring device comprises a spiral spring and at least one elastomer.

10. The pedal operating unit as claimed in claim 9, wherein the increase in the restoring force brought about by the second restoring device is effected only by the spiral spring over a first force range, and is effected by the spiral spring and the elastic element over a second force range.

11. The pedal operating unit as claimed in claim 10, wherein the second restoring device is articulated on the spring disk by means of a first end.

12. The pedal operating unit as claimed in claim 10, wherein the articulation point of the second restoring device on the spring disk is spaced apart from the second pivot.

13. The pedal operating unit as claimed in claim 1, further comprising a stop element arranged on the housing, wherein the stop element limits a movement of the lever in the direction of the restoring force produced by the restoring mechanism.

14. The pedal operating unit as claimed in claim 13, wherein the pedal operating unit comprises at least one sensor device configured to detect the degree of deflection of the brake pedal out of the rest position.

15. The pedal operating unit as claimed in claim 14, wherein the sensor device is designed to determine a rotation angle of the lever relative to a rest position of the lever about the second pivot.

16. The pedal operating unit as claimed in claim 15, wherein the pedal operating unit comprises at least one force sensor configured to detect a force acting on the brake pedal.

* * * * *